H. HARSEY.
PULLER.
APPLICATION FILED JUNE 1, 1912.
1,061,840.
Patented May 13, 1913.
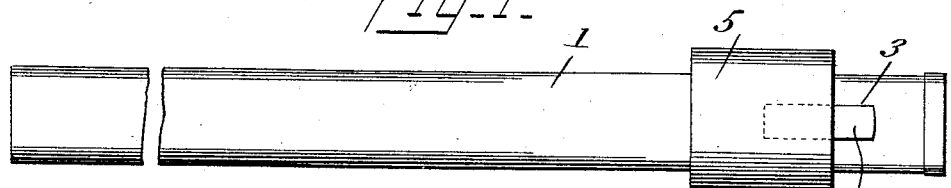
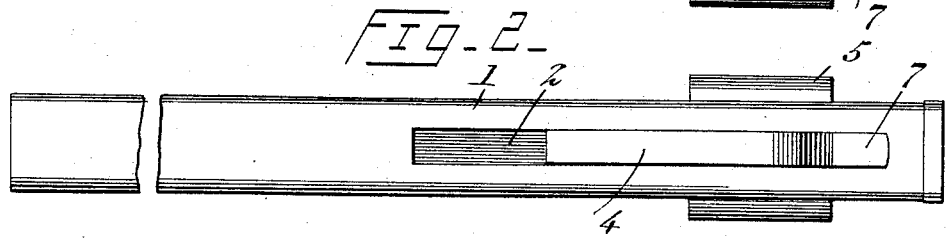
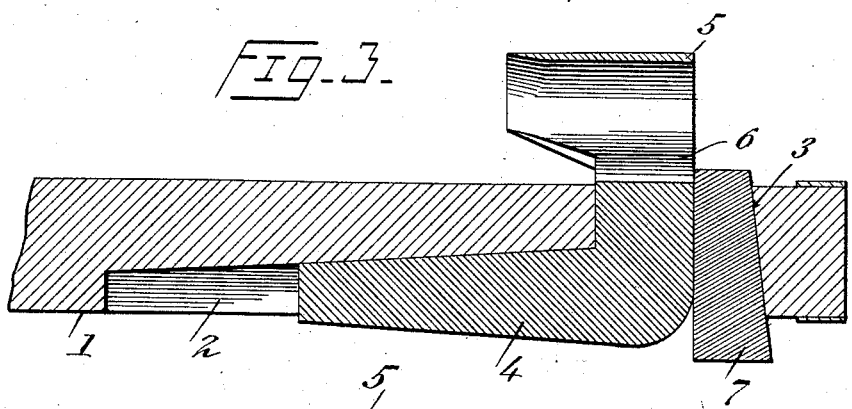
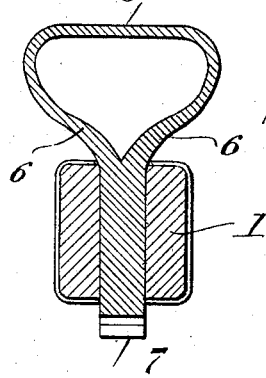
Witnesses
R. F. Maryman.
Inventor
Haskell Harsey
By Victor J. Evans
Attorney

UNITED STATES PATENT OFFICE.

HASKELL HARSEY, OF ANDALUSIA, ALABAMA, ASSIGNOR OF ONE-HALF TO JAMES H. SENTERFITT, OF ANDALUSIA, ALABAMA.

PULLER.

1,061,840. Specification of Letters Patent. Patented May 13, 1913.

Application filed June 1, 1912. Serial No. 701,101.

*To all whom it may concern:*

Be it known that I, HASKELL HARSEY, a citizen of the United States, residing at Andalusia, in the county of Covington and State of Alabama, have invented new and useful Improvements in Pullers, of which the following is a specification.

This invention relates to pullers and puller stocks.

One of the principal objects of the invention is to simplify the method heretofore employed in attaching the tool to the stock or handle and which prevents any lateral or longitudinal displacement of the tool.

Further objects of this invention will appear as the following specific description is read in connection with the accompanying drawing, which forms a part of this application, and in which:—

Figure 1 is a side elevation. Fig. 2 is a rear elevation. Fig. 3 is a longitudinal sectional view. Fig. 4 is a transverse sectional view.

Referring more particularly to the drawing, 1 represents the handle or stock which is provided in its rear face with a longitudinal groove 2 communicating with a transverse wedge receiving aperture 3. The tool consists of the shank 4 connected to a curved substantially oval plate 5 by means of the arms 6 which are welded together and merged into the shank. When the tool is placed in the handle or stock 1 the arms extend through the passage 3 and the shank lies in the longitudinal channel 2, thereby preventing lateral movement of the shank and a twisting movement of the tool. The tool is held in this position by a wedge 7 which, when driven home, holds the arms down against the lower wall of the opening 3 and the shank in engagement with the channel 2.

What is claimed is:—

A device of the class described comprising a stock having a longitudinal groove in one side thereof and a transverse aperture extending through the stock and communicating with the groove, a tool having curved cutting blades, a shank substantially parallel therewith, and a connection between the shank and the blade, said tool having its shank seated in the groove of the stock and the connecting portion between the shank and the blade seated in the aperture, and a wedge driven in the aperture for holding the tool against displacement.

In testimony whereof I affix my signature in presence of two witnesses.

HASKELL HARSEY.

Witnesses:
J. S. W. CAWTHON,
JAMES TIPTON, Jr.

Copies of this patent may be obtained for five cents each, by addressing the "Commissioner of Patents, Washington, D. C."